United States Patent Office.

JAMES HENDERSON, OF BELLEFONTE, PENNSYLVANIA.

PROCESS OF PURIFYING IRON AND CONDENSING THE PRODUCTS.

SPECIFICATION forming part of Letters Patent No. 283,241, dated August 14, 1883.

Application filed July 14, 1883. (No specimens.)

*To all whom it may concern:*

Be it known that I, JAMES HENDERSON, of Bellefonte, Centre county, State of Pennsylvania, (formerly of New York city,) have invented a new and useful improvement in processes for purifying iron by means of oxygen and hydrogen gases and condensing the gaseous products therefrom, of which the following is a full, clear, and exact description and specification.

The object of this invention is to make iron and steel more economically by using oxygen and hydrogen as reagents for removing phosphorus and sulphur, and condensing the products of the reaction and collecting them.

This my invention is based on the discovery that iron when exposed to an oxidizing-flame, which also contains the elementary constituents of water, either in the state of combination or dissociation, and when the iron is not covered or protected from the action of the flame and vapor of water by covering of cinder, slag, or oxidizing agents, the iron, while in either the solid or liquid condition, may be purified of sulphur and phosphorus by the action of flame, which removes these elements in the gaseous form without the aid of other reagents, and the gases thus produced are economically recovered as valuable by-products on condensation by cooling them on surface-condensers, or by use of spray or dip condenser, or combinations of two or more of them.

In carrying out this my invention I prefer to use the apparatus and process described in application for Letters Patent No. 87,393 for purifying iron in conjunction with the condensing apparatus described in application No. 98,191, or the furnace and condensing apparatuses described in this latter application may be used, or the condenser and furnace described in Letters Patent granted to me on the 26th day of June, 1883, No. 279,947, may be employed or any other suitable purifying vessel or furnace with any other suitable condenser may be employed.

The preferred mode of producing the hydrogen and oxygen gases is to charge coal into a gas-producer similar to those described in the hereinbefore-recited inventions, the coal to be such as will produce at least one part, by volume, of hydrogen (more is of no disadvantage) to every three parts, by volume, of carbonic oxide produced by the admission of air at the tuyeres of the producer, and when the fuel does not produce this proportion of hydrogen, steam, preferably superheated, is introduced into the producer among the incandescent fuel, where, by its decomposition into hydrogen and oxygen, enough hydrogen is obtained, while the oxygen combines with its one equivalent of carbon and becomes carbonic oxide. The hydrogen thus supplied should be in the proportion of at least one-third of the volume of carbonic oxide produced from the oxygen of the decomposed steam and from the oxygen of the air blown in at the tuyeres. These gases are supplied with sufficient air to produce complete combustion, a portion of said air or the oxygen of it combining with hydrogen and producing vapor of water or its elementary constituents intensely heated, and another portion of said air combining with the carbonic oxide to form carbonic acid. The iron to be treated may be heated in the flame to a degree just below the point of fusion, which flame is produced by the use of an excess of air over that required for complete combustion, and maintained in this condition until the depuration is accomplished; or the iron may be melted in the flame, during which time a portion of the phosphorus is removed, and the iron is then heated to and maintained in a state of fusion by the high temperatures until the required purification is accomplished. During the purification the slags may be tapped off, preferably from the upper tap-hole of the furnace. The removal of the slags exposes the surface of the metal to the action of the flame when the flame enters over the metal, and the metal is more readily acted upon when the slag is thus removed. If preferred, the metal may be taken in a molten condition from any other furnace and treated in the manner herein described. These highly-heated gases, impinging on the iron, form gaseous compounds with the carbon, sulphur, and phosphorus, and remove them in the gaseous form, thus depurating the iron, while the sulphur and phosphorus compounds, being readily condensible by water or by surface-condensing when in admixture with steam, are condensed in or by the apparatus hereinbefore referred to. The condensers are preferably arranged so as to cool the gases to about the mean temperature of the atmosphere, or considerably below the point at which phosphorus volatilizes. The condensation of the gases produces water and solid phosphorus, and when sulphur is present sulphuric acid is also produced. The phosphorus is recovered by draining the liquids away from it. Other kinds of fuel may be employed—such as natural gases from gas-wells, or gases that are produced from the heating and distillation of solid fuel or volatilization of liquids or liquid hydrocarbons, or which may be produced artificially by the action of steam on fuel—which will contain sufficient hydrogen to give about the relative proportions of hydrogen to carbon hereinbefore described applied in admixture with air regulated to produce complete combustion and to impinge on the metal; or steam, superheated or otherwise, may be forced into liquid metal in a reverberatory chamber heated with solid or gaseous fuel when the hearth in which the iron is treated is composed of a substance which is basic or is not silicious, or when the silicious substance is protected from the action of the iron, so as not to produce a silicious slag from the lining during the purification, or arranged so that the slags may flow away from the metal as fast as produced, as described in application for Letters Patent No. 87,393; or gaseous fuel may be burned with air in a separate chamber under great pressure, and the flame thus produced (which should be oxidizing) be forced in jets into or upon the metal. The said jets may be made to enter the metal in the molten state from below upward, or by refractory pipes introduced into the metal from the top when the metal is treated in such manner as will not produce silicious slags, or slags which contain over about twenty-five per cent. of silica, or where the slags are removed after desiliconization of the metal. The flame hereinbefore described, acting upon the metal, removes the phosphorus and sulphur, as hereinbefore described. The proportions of hydrogen to carbon hereinbefore given should be maintained, and sufficient air be employed to produce complete combustion or an oxidizing-flame, as may be preferred; or steam, or steam and air, may be introduced into molten iron in a vessel, furnace, or converter, so that it may act upon the metal from the bottom or sides of the vessel, furnace, or converter without the aid of other fuel than that contained in the iron when the vessel or furnace or converter is arranged so that silicious slags are not present during the elimination of the phosphorus, which plans of protecting the iron from the action of silicious slags are well known, and described in Letters Patent already granted to me, or by pouring the slags from the converter after desiliconization. In this application of steam to the dephosphorization of iron it is preferred to use the steam in a regulated proportionate quantity to the air supplied to the operation of the process of refining, the quantity or proportions being regulated by a pump to force a measured quantity of water into a steam-generator, said pump being preferably worked by connection with the fly-wheel shaft of the blowing-engine supplying the air for the decarbonization, so that each revolution of the blast-engine gives a proportionate supply of water, which is forced through a coil steam-boiler and converted into a measured quantity of steam, which steam decomposes in the presence of the flame produced by the combustion of impurities of the iron and becomes hydrogen and oxygen, and removes the impurities from the metal, and the gaseous condensible portions of the impurities (except carbonic acid) are conveyed away to cooling and condensing apparatus and recovered.

The hereinbefore-described process of producing gaseous compounds of phosphorus and sulphur should always be operated at a high temperature, produced either by the combustion of the impurities in the iron, or by that of fuel in a chamber in which the metal is contained, or in an auxiliary chamber or flues leading to such chamber. It is applicable to removing the phosphorus from iron while in a solid or liquid condition, and the metal may be crude metal or wholly or partially desiliconized or decarbonized, or mixtures of any of these metals.

I am aware that steam and steam and air have been used in puddling-furnaces; but it has not been observed that the phosphorus was volatilized, and there has not been any attempt to recover the gaseous products by their condensation, nor until my invention of condensing the gaseous products from treating iron by the action of fluorides and oxidizing agents was it known that phosphorus could be removed from iron in a gaseous form; nor was it described that it could be condensed and recovered as a by-product previous to my invention described in Patent No. 279,947, dated June 26, 1883. Steam and air, or steam alone, has been used in the Bessemer process, with use of silicious linings to the containing-vessel, and by reason of the silicious slags formed, which prevented the phosphorus leaving the metal, such use of steam was abandoned, as inferior to the use of air alone.

Steam impinging on iron heated to high temperatures decomposes to oxygen and hydrogen and cools the metal, so that when applied to metal in a Bessemer converter it cools it, so that it is difficult to pour the metal. It is therefore preferred to use air with the steam when the fuel present is the impurities of the metal; but I do not wish to be understood as limiting my invention to the use of air with hydrogen and oxygen with the impurities; but steam without air, and preferably superheated, when injected into molten metal in a Bessemer converter will remove the phosphorus, provided the vessel does not contain a silicious lining, or that silicious slags are not present in the converter before or during the operation.

I do not claim, broadly, the condensing of gaseous products from metallurgical operations, nor the condensation of phosphorus derived from the manufacture of iron and steel by the action of fluorides and oxidizing agents, as that is claimed in Letters Patent No. 279,947, of June 26, 1883, to me. Nor do I wish to be understood as limiting my claims of invention to the proportions or the apparatus hereinbefore described for carrying out my said invention, as others may be employed and good results obtained.

What I claim, and desire to secure by Letters Patent, is—

The compound process, substantially as before set forth, of depurating iron and recovering the condensible products thereof, consisting of subjecting the heated metal to the action of the vapor of water and condensing the resulting condensible products, substantially as described.

JAMES HENDERSON.

Witnesses:
JOSEPH J. SULLIVAN,
JOHN E. ELMENDORF.